United States Patent
Farrell

(10) Patent No.: US 12,440,645 B2
(45) Date of Patent: Oct. 14, 2025

(54) MEDICAL DEVICE PRODUCTS INCLUDING DRAW ELEMENTS

(71) Applicant: Hollister Incorporated, Libertyville, IL (US)

(72) Inventor: David J. Farrell, Ballina (IE)

(73) Assignee: Hollister Incorporated, Libertyville, IL (US)

( * ) Notice: Subject to any disclaimer, the term of this patent is extended or adjusted under 35 U.S.C. 154(b) by 442 days.

(21) Appl. No.: 17/996,761

(22) PCT Filed: Apr. 29, 2021

(86) PCT No.: PCT/US2021/029979
§ 371 (c)(1),
(2) Date: Oct. 20, 2022

(87) PCT Pub. No.: WO2021/222632
PCT Pub. Date: Nov. 4, 2021

(65) Prior Publication Data
US 2023/0166074 A1  Jun. 1, 2023

Related U.S. Application Data

(60) Provisional application No. 63/018,668, filed on May 1, 2020.

(51) Int. Cl.
*A61M 25/00* (2006.01)

(52) U.S. Cl.
CPC ...... *A61M 25/002* (2013.01); *A61M 25/0017* (2013.01); *A61M 2025/0046* (2013.01)

(58) Field of Classification Search
CPC ............ A61M 25/002; A61M 25/0017; A61M 2025/0046
See application file for complete search history.

(56) References Cited

U.S. PATENT DOCUMENTS 4,861,632 A * 8/1989 Caggiano .............. B32B 27/304
426/127
5,938,012 A * 8/1999 Yeager .................. B65D 81/22
206/256

(Continued)

FOREIGN PATENT DOCUMENTS

| EP | 2060296 A1 | 5/2009 |
| WO | 2009120840 A2 | 10/2009 |
| WO | 2015065725 A1 | 5/2015 |

OTHER PUBLICATIONS

Zhang, ChunXiao, et al. "Research on various factors influencing the moisture absorption property of sodium polyacrylate." Science in China Series B: Chemistry 52 (2009): 1000-1008. (Year: 2009).*

(Continued)

*Primary Examiner* — Adam Marcetich
(74) *Attorney, Agent, or Firm* — Cook Alex Ltd.

(57) ABSTRACT

A medical device product (10) comprises a package (12) defining an interior cavity (14). The interior cavity includes a first compartment (16) and a second compartment (18) that are separated by a vapor permeable barrier (20). A vapor donating liquid (22) is located in the first compartment, and the vapor donating liquid donates a vapor (28). A medical device (24) and a draw element (26) are located in the second compartment. The medical device includes at least a portion that is activated by the vapor. The draw element draws the vapor from the first compartment across the barrier and into the second compartment. The vapor activates the portion of the medical device.

18 Claims, 1 Drawing Sheet

(56) References Cited

U.S. PATENT DOCUMENTS

| | | | |
|---|---|---|---|
| 6,065,597 A | 5/2000 | Pettersson et al. | |
| 6,645,483 B2 | 11/2003 | McGhee | |
| 7,694,810 B1 | 4/2010 | Barry et al. | |
| 8,523,843 B2 | 9/2013 | Kavanagh et al. | |
| 9,649,472 B2 | 5/2017 | Kearns et al. | |
| 2006/0089217 A1* | 4/2006 | Lin | B65D 81/2076 |
| | | | 473/579 |
| 2006/0163097 A1* | 7/2006 | Murray | B65B 55/22 |
| | | | 206/364 |
| 2006/0186010 A1* | 8/2006 | Warnack | A61M 25/002 |
| | | | 428/34.1 |
| 2007/0029314 A1* | 2/2007 | Rodgers | B65D 81/3461 |
| | | | 219/730 |
| 2007/0127853 A1* | 6/2007 | Bezek | B65B 9/20 |
| | | | 53/445 |
| 2010/0263327 A1* | 10/2010 | Murray | B65D 51/00 |
| | | | 53/461 |
| 2015/0265801 A1 | 9/2015 | Rostami | |
| 2015/0297861 A1* | 10/2015 | Passalaqua | B65B 5/045 |
| | | | 53/434 |
| 2015/0306342 A1 | 10/2015 | Rostami et al. | |
| 2015/0314103 A1 | 11/2015 | Hannon et al. | |
| 2016/0135895 A1 | 5/2016 | Faasse et al. | |
| 2017/0152066 A1 | 6/2017 | Kawashima | |
| 2018/0021481 A1 | 1/2018 | Yin et al. | |
| 2020/0054795 A1 | 2/2020 | Farrell et al. | |

OTHER PUBLICATIONS

Hygroscopic meaning: Absorbs moisture from the air—OneLook https://www.onelook.com/?w=hygroscopic&loc=home_ac_. Accessed Jun. 13, 2025.*
Hydroscopic meaning: Absorbs moisture from the air—OneLook https://www.onelook.com/?w=hydroscopic. Accessed Jun. 13, 2025.*
International Search Report and Written Opinion for PCT/US2021/029979 Dated Sep. 28, 2021.

* cited by examiner

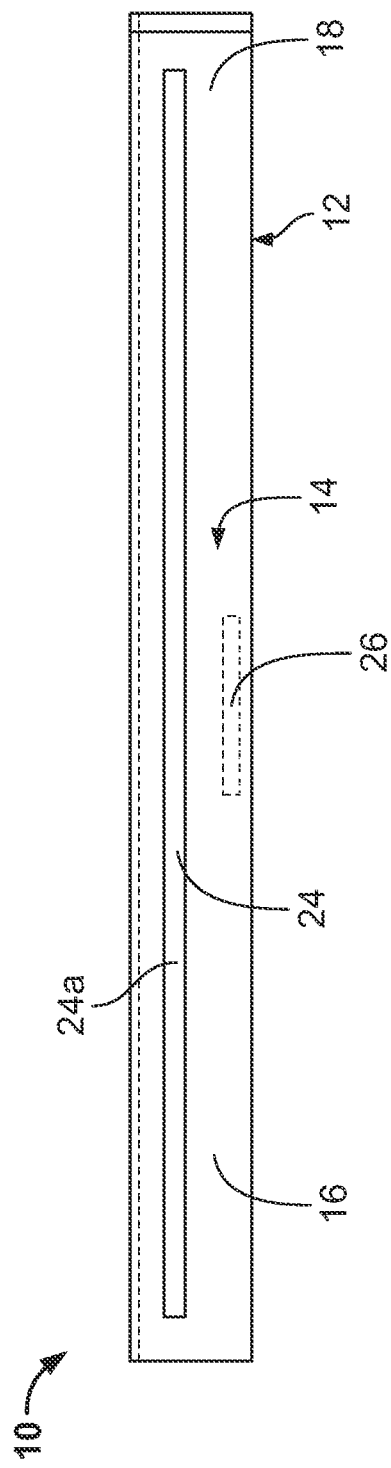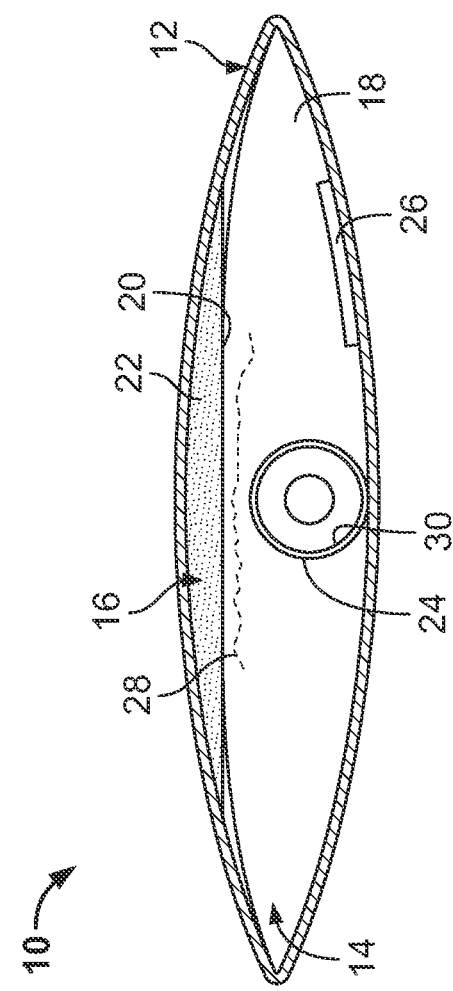

MEDICAL DEVICE PRODUCTS INCLUDING DRAW ELEMENTS

The present application is the U.S. National Stage Application of PCT Application No. PCT/US2021/029979, filed Apr. 29, 2021, which claims the benefit of and priority to U.S. Provisional Application No. 63/018,668, filed May 1, 2020, all of which is are hereby incorporated herein by reference.

BACKGROUND

Field of the Disclosure

The present disclosure generally relates to medical device products. More particularly, the present disclosure relates to medical device products having fluid draw elements.

Description of Related Art

Some medical device products depend on contact with a hydration medium to prepare the device for use. One such medical device is a hydrophilic intermittent urinary catheter, in which the hydrophilic portion of the catheter is hydrated by a hydration medium. In some products the hydration medium is a vapor hydration medium, such as water vapor, that is donated or provided by a liquid. For example, a medical device product may include a package containing a medical device and a liquid, wherein the liquid is separated from the medical device by a vapor permeable, liquid impermeable barrier. The liquid donates a vapor hydration medium that passes through the vapor permeable, liquid impermeable barrier. The vapor hydration medium then contacts the medical device to hydrate the device. The hydration may activate, preserve, or otherwise condition the device.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as set forth in the claims appended hereto.

In one aspect, a medical device product is disclosed. The product comprises a package defining an interior cavity. The interior cavity includes a first compartment and a second compartment that are separated by a vapor permeable barrier. A vapor donating liquid is located in the first compartment, and the vapor donating liquid donates a vapor. A medical device and a draw element are located in the second compartment. The medical device includes at least a portion that is activated by the vapor. The draw element draws the vapor from the first compartment across the barrier and into the second compartment. The vapor activates the portion of the medical device.

In another aspect a urinary catheter product is disclosed. The urinary catheter product comprises a package defining an interior cavity. The interior cavity includes a first compartment and a second compartment that are separated by a vapor permeable barrier. A vapor donating liquid is located in the first compartment. The vapor donating liquid donates a vapor. A urinary catheter and a draw element are located in the second compartment. The catheter includes at least a portion comprising a hydrophilic material that is activated by the vapor. The draw element draws the vapor from the first compartment across the barrier and into the second compartment, and the vapor activates the portion of the catheter.

BRIEF DESCRIPTION OF THE DRAWINGS

FIG. 1 is a top view of an embodiment of a package for a medical device product, according to an aspect of the present disclosure;

FIG. 2 is a cross-sectional view of the package of FIG. 1.

DESCRIPTION OF THE ILLUSTRATED EMBODIMENTS

The embodiments disclosed herein are for the purpose of providing a description of the present subject matter, and it is understood that the subject matter may be embodied in various other forms and combinations not shown in detail. Therefore, specific embodiments and features disclosed herein are not to be interpreted as limiting the subject matter as defined in the accompanying claims.

FIGS. 1 and 2 illustrate an embodiment of a medical device product 10. The medical device product 10 comprises a package 12 defining an interior cavity 14. The interior cavity 14 includes a first compartment 16 and a second compartment 18 that are separated by a vapor permeable barrier 20. The barrier 20 may be configured to allow different types of vapor 28 to pass through the barrier 20. The barrier 20 may be formed of one or more sheets or layers of a gas-permeable material. The barrier 20 also may be liquid impermeable. The first compartment 16 may be defined between the walls of the package and the gas-permeable barrier 20. For example, the barrier 20 may be secured to the inner surface of the package 12 by any suitable means, such as a heat seal, to define the first compartment 16. In other embodiments, the compartment 16 may be completely defined by the barrier 20. For example, the compartment 16 may be a sachet that is defined by the barrier 20. The outer walls of the package 12 may be made from materials having a very low moisture vapor transmission rate (MVTR). The walls form the sealed interior cavity 14. The package 12 may be made from material that creates a liquid-tight seal.

A vapor donating liquid 22 is located in the first compartment 16, and the vapor donating liquid 22 donates a hydration vapor 28. The vapor-donating liquid 22 may be loosely or freely disposed within the first compartment 16, or the vapor-donating liquid 22 may be contained within a material, such as a sponge or fabric. In one embodiment, the vapor donating liquid 22 may comprise water. In alternative embodiments, other appropriate types of vapor donating liquid may be used. Vapor 28 may include but is not limited to water vapor.

A medical device 24 and a draw element 26 are located in the second compartment 18. The medical device 24 includes at least a portion 24a that is activated by the vapor 28. In an embodiment the portion 24a may span a section of the medical device 24. In another embodiment the portion 24a may span the whole surface of the medical device 24. The medical device 24 may be any medical device that is hydrated by the vapor 28. For example, the medical device 24 may be a hydrophilic intermittent urinary catheter, wherein the vapor hydrates the hydrophilic material of the catheter to render it lubricous. The hydrophilic material may be, for example, a hydrophilic coating.

The draw element 26 draws the vapor 28 from the first compartment 16 across the barrier 20 and into the second compartment 18. The vapor 28 diffuses through the barrier 20, into the second compartment 18. When the vapor 28 diffuses into the second compartment 18, it increases the relative humidity in the second compartment 18 and hydrates the portion 24a of the medical device 24. In this manner, the interior cavity 14 formed by the package 12 positions the device 24 in the second compartment 18 and the vapor-donating liquid 22 in the first compartment 16, such that the device is maintained out of direct contact with the liquid 22, while still being hydrated by the vapor 28 donated or produced from the liquid 22.

The draw element 26 may be configured to absorb vapor 28 donated by the vapor donating liquid 22. The draw element 26 may also absorb any loose liquid that may form in the second compartment 18. In an embodiment, the draw element 26 may include a desiccant, or a deliquescent. The desiccant helps promote migration of the vapor from the first compartment 16, across the barrier 20 and into the second compartment 18. The draw element 26 may be a hydroscopic osmolyte. In an embodiment, the osmolyte may be a liquid and may include glycerol. In an alternative embodiment, the osmolyte may be a solid, and may include at least one of a salt and a solid glycerol composition. The salt may include sodium chloride. The solid glycerol composition may include a glycerol soap. In another embodiment, the osmolyte may comprise a gel. At least a portion of the osmolyte may be configured to be soluble in water. The osmolyte promotes the acceleration of vapor 28 activation of the device 24 by drawing the vapor 28 across the barrier 20. Additionally, as the osmolyte absorbs liquid, it may liquefy or go into solution with the absorbed vapor donating liquid 22.

In an alternative embodiment, the draw element may be added to a lumen of the device in order to promote the migration of vapor to the device. For example, if the device has a hydrophilic coating on its surface, the inclusion of the draw element may allow the surface to hydrate more quickly. In one embodiment, the draw element may be associated with the inner surface 30 of the catheter wall forming the lumen. In alternative embodiments, the draw element may be applied to the coating surface.

In one embodiment, the quantity of the draw element may be at most 100 milligrams (mg). In another embodiment, the quantity of the draw element may be at most 50 mg. Other appropriate quantities may be used depending on the size of the package or the device. In an embodiment the solid glycerol composition may comprise 60 grams (g) glycerin, 3 g sodium carbonate and 5 g stearic acid. However, other appropriate measurements and ratios may also be used.

In one embodiment, the draw element may be made by dissolving the sodium carbonate in the glycerin using a hot plate or water bath. Next the stearic acid is added. In one embodiment, the stearic acid is slowly added. The mixture is heated until the glycerin, sodium carbonate and stearic acid are fully dissolved, and the escape of carbonic acid gas has ceased. Next, the liquified mixture is poured into at least one suitable mold. The mixture is configured to solidify in the molds into appropriately shaped pellets or tablets. The mixture is left to sit and solidify, and once solid, the solidified pellets or tablets are removed. The composition with 60 g glycerin, 3 g sodium carbonate, and 5 g stearic acid yields a draw element containing almost 90 percent glycerin. In one embodiment the draw element contains between 80-90% glycerin, or between 85%-90% glycerin. In another embodiment the draw element may be about 88% glycerin.

Though the product described above includes embodiments with one or two cavities, any appropriate number of cavities or compartments may be used. Additionally, in alternative embodiments, the package may be configured to contain a plurality of medical devices, a plurality of draw elements, and/or a plurality of vapor-donating liquids.

Other variations and combinations may also be employed without departing from the scope of the present disclosure.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof, including as combinations of features that are individually disclosed or claimed herein.

What is claimed is:

1. A medical device product, comprising:
    a package defining an interior cavity, the interior cavity including a first compartment and a second compartment that are separated by a vapor permeable barrier;
    a vapor donating liquid being located in the first compartment, the vapor donating liquid donating a vapor;
    a medical device and a draw element located in the second compartment, the medical device including at least a portion that is activated by the vapor; and
    wherein the draw element comprises a hygroscopic osmolyte that includes glycerol and the draw element draws the vapor from the first compartment across the barrier and into the second compartment, and wherein the vapor activates the portion of the medical device.

2. The product of claim 1, wherein the draw element is configured to absorb vapor donated by vapor donating liquid.

3. The product of claim 1, wherein the osmolyte comprises a liquid.

4. The product of claim 1, wherein the osmolyte comprises a solid.

5. The product of claim 1, wherein the osmolyte includes at least one of a salt and a solid glycerol composition.

6. The product of claim 1, wherein the osmolyte comprises a gel.

7. The product of claim 1, wherein at least a portion of the osmolyte is configured to be soluble in water.

8. The product of claim 1, wherein the barrier is liquid impermeable.

9. The product of claim 1, wherein the device is a urinary catheter, at least a portion of the catheter including a coating which produces a low-friction surface on the catheter when treated with the vapor.

10. The product of claim 9, wherein the surface of the catheter is configured to be hydrated by the vapor.

11. A urinary catheter product, comprising:
    a package defining an interior cavity, the interior cavity including a first compartment and a second compartment that are separated by a vapor permeable barrier;
    a vapor donating liquid being located in the first compartment, the vapor donating liquid donating a vapor;

a urinary catheter and a draw element located in the second compartment, the catheter including at least a portion comprising a hydrophilic material that is activated by the vapor; and wherein the draw element comprises a hygroscopic osmolyte that includes glycerol and the draw element draws the vapor from the first compartment across the barrier and into the second compartment, and wherein the vapor activates the portion of the catheter.

12. The product of claim 11, wherein the draw element is configured to absorb vapor donated by the vapor donating liquid.

13. The product of claim 11, wherein the osmolyte comprises a liquid.

14. The product of claim 11, wherein the osmolyte comprises a solid.

15. The product of claim 11, wherein the osmolyte comprises a gel.

16. The product of claim 11, wherein the urinary catheter has a catheter wall including an inner surface forming a lumen and the draw element is associated with the inner surface.

17. The product of claim 11, wherein the draw element contains between 80% and 90% glycerol.

18. The product of claim 11, wherein the draw element further includes sodium carbonate and stearic acid.

* * * * *